No. 749,115. Patented January 5, 1904.

UNITED STATES PATENT OFFICE.

BENJAMIN TALBOT, OF LEEDS, ENGLAND, AND PAUL GREDT, OF LUXEMBURG, GERMANY, ASSIGNORS TO THE CONTINUOUS METAL REFINING COMPANY, OF PHILADELPHIA, PENNSYLVANIA, A CORPORATION OF PENNSYLVANIA.

MANUFACTURE OF STEEL AND INGOT-IRON.

SPECIFICATION forming part of Letters Patent No. 749,115, dated January 5, 1904.

Application filed March 10, 1903. Serial No. 147,048. (No specimens.)

*To all whom it may concern:*

Be it known that we, BENJAMIN TALBOT, a subject of His Majesty the King of Great Britain, residing at Leeds, England, and PAUL GREDT, a subject of the Grand Duke of Luxemburg, residing at Luxemburg, Germany, have invented a certain new and useful Improvement in the Manufacture of Steel and Ingot-Iron, of which the following is a specification.

The present invention relates to the manufacture of steel or ingot-iron by what is generally known as the "Bessemer" process and is applicable to same either in its acid or basic forms.

By the use of this invention an increased yield of metal over that usually obtained may be secured, and the afterblow usual when treating phosphoric metal may be considerably reduced and at times completely omitted, a further advantage being that the present invention permits of the use of phosphoric pig-iron rich in silicon and low in manganese, such as can be produced from many phosphoric ores without the addition of a special manganese ore to the blast-furnace burden.

To this end the invention consists in first purifying a charge of metal in a Bessemer converter or similar vessel, running off a portion of the charge, and adding to the remainder a further charge of impure metal, so as to secure a reaction between the metalloids carried by the added metal and the slag and purified metal which were in the converter, by which means the main portion of the silicon and a part of the carbon contained in the added metal are eliminated without oxidation by the blast being necessary, and then completing the purification in the usual way in the same vessel or in another vessel different from it. When this charge has been purified, a portion of the same may be poured off, and the process of addition and purification by further charges of impure metal may be repeated. It will probably be preferable to employ a converter of large capacity—say, for example, one capable of carrying twenty-five tons—and to pour off about half of the charge at a time; but the invention is not limited to the size of the converter or the amount of purified metal poured off, as those features will necessarily vary with the size of the plant at disposal and the character of the impure metal to be treated. The reaction takes place most rapidly when the percentage of carbon in the purified metal is low. Thus if there be less than about fifteen per cent. of carbon in the blown metal the reaction commences as soon as the impure metal is added. This is probably due to the fact that there is then in the metal a large amount of dissolved oxygen, and this, with the oxids in the slag, combines with the carbon contained in the impure added metal, forming carbonic oxid. This carbonic oxid may be burned to carbonic acid in the vessel itself, thereby generating great heat in the converter and hastening the purification. When the reaction due to charging impure metal into the slag-covered bath of purified metal has ceased, the vessel may be turned down and part of the slag poured off, or if the metalloids (as silicon, carbon, and phosphorus) in the added metal have not been eliminated to the desired extent the charge may be blown until the desired result is attained. After removal of a part of the slag the remainder may be enriched by the addition of oxids in order to hasten the oxidation of the metalloids in the further impure metal to be added. When using a phosphoric metal, sufficient lime should be introduced, preferably prior to the introduction of the impure metal and after the reaction, which ensues upon the introduction of such impure metal, the further elimination of the phosphorus and the carbon is secured by blowing in the ordinary way.

The operation may be conducted so that a charge of impure metal is first purified by removing the bulk of the silicon, part of the carbon, and more or less of the phosphorus in a converter, a portion of the thus-purified charge poured off, the remainder of the phosphorus eliminated by lime and blowing, the slag produced in the operation removed, oxids added to the bath, a further charge of impure metal added, and the combined charge blown.

The term "purifying," as used in the description and claims, is to be understood as referring to the operation of removing in greater or less degree silicon, phosphorus, and carbon. The expression "enriching" is to be understood as meaning the incorporation with the slag of such additional oxid or lime as may be required for effecting the desired result.

If the impure metal is not too silicious, lime or a mixture of lime and oxids of iron may be added to the slag, the impure metal being then run in, and after the reaction has quieted down the charge may be blown until the operation is completed and without pouring off the slag before finishing.

By working as above described the usual afterblow period is considerably shortened and is even at times unnecessary, and the yield of the purified metal is considerably increased, the latter being due to the direct reduction of the oxids added in the converter as well as to the lack of the loss of metal from the afterblow.

When carrying out this process, there may sometimes be a danger of the charge cooling down too much, and to prevent this the bath may be heated by gas, petroleum, powdered coke, or other fuel, and the slag and oxid additions may be added in a heated or liquid state.

What is claimed is—

1. The process of manufacturing steel and ingot-iron consisting in first purifying a charge of metal by blowing it in a Bessemer converter or similar vessel then running off a portion of the charge, then adding to the remainder a further charge of impure metal and blowing the combined charge substantially as set forth.

2. The process of manufacturing steel and ingot-iron consisting in first purifying a charge of impure metal by blowing it in a Bessemer converter or similar vessel then running off a portion of the charge, then enriching the slag remaining in the vessel, then adding a further charge of impure metal and blowing the combined charge, substantially as set forth.

3. The process of manufacturing steel and ingot-iron consisting in first purifying a charge of impure metal in a Bessemer converter or similar vessel then running off a portion of the charge, then eliminating the phosphorus by lime and blowing, then removing the slag so produced and adding oxids to the bath and then adding a further charge of impure metal and blowing the combined charge, substantially as set forth.

In testimony whereof we have hereunto set our hands in the presence of two subscribing witnesses.

BENJAMIN TALBOT.
PAUL GREDT.

Witnesses to the signature of Benjamin Talbot:
THOMAS S. GATES,
UTLEY E. CRANE, Jr.

Witnesses to signature of Paul Gredt:
GEO. W. ROOSEVELT,
GREGORY PHELAN.